(12) United States Patent
Akasaka et al.

(10) Patent No.: US 6,733,817 B2
(45) Date of Patent: May 11, 2004

(54) PROCESS FOR PRODUCING FROZEN YUBA

(75) Inventors: Mizuho Akasaka, Kobe (JP); Shin Nakatani, Kobe (JP); Tomohiko Adachi, Kobe (JP)

(73) Assignee: Fuji Oil Company, Limited, Osaka (JP)

( * ) Notice: Subject to any disclaimer, the term of this patent is extended or adjusted under 35 U.S.C. 154(b) by 0 days.

(21) Appl. No.: 10/380,282

(22) PCT Filed: Jul. 22, 2002

(86) PCT No.: PCT/JP02/07399
§ 371 (c)(1),
(2), (4) Date: Mar. 12, 2003

(87) PCT Pub. No.: WO03/009706
PCT Pub. Date: Feb. 6, 2003

(65) Prior Publication Data
US 2003/0180438 A1 Sep. 25, 2003

(30) Foreign Application Priority Data
Jul. 25, 2001 (JP) .................................. 2001-223893

(51) Int. Cl.⁷ .................................................. A23L 1/20
(52) U.S. Cl. ....................................... 426/634; 426/442
(58) Field of Search .................................. 426/634, 422

(56) References Cited

FOREIGN PATENT DOCUMENTS

JP     2001-57860 A     3/2001

OTHER PUBLICATIONS

Abstract of JP 8294371, published Nov. 12, 1996. Inventor: Nobuhiro.*
Abstract of JP 7132062, published May 23, 1995. Inventor: Toshio.*

* cited by examiner

Primary Examiner—Anthony Weier
(74) Attorney, Agent, or Firm—Wenderoth, Lind & Ponack, L.L.P.

(57) ABSTRACT

The present invention provides a method for producing a frozen "yuba" which exhibits, after being thawed, a smooth and soft mouthfeel and a satisfactory taste equivalent to those of a fresh lifted-up "yuba", which includes heating a "yuba" whose water content has been adjusted at 60% or less together with soybean milk adjusted at a concentration of 2 to 12 Bx in a mixing ratio of 1:1 or higher at a temperature of 70 to 100° C. followed by freezing the resultant.

9 Claims, No Drawings

PROCESS FOR PRODUCING FROZEN YUBA

FIELD OF THE INVENTION

The present invention relates to a method for producing a frozen "yuba".

BACKGROUND OF THE INVENTION

A "yuba" is made from soybean milk like tofu. When soybean milk as a starting material is heated to a temperature at which boiling is still avoided, its surface forms a film, which is lifted up with a skewer or wire as a fresh "yuba". Among such films, the very first film lifted up with soybean milk is called as a fresh lifted-up "yuba", whose flavor and texture are excellent especially. A dried "yuba" is made by means of spontaneous drying or hot air drying of a fresh "yuba".

A fresh "yuba" or fresh lifted-up "yuba" is recently not only consumed in a first-class Japanese restaurant but also purchased from a tofu shop or first-class Japanese restaurant through mail-order selling or over-the-counter selling. However, it is distributed only by chilled-marketing since it is denatured and becomes harder when being frozen, resulting in a substantial restriction in distribution and marketing. Thus, since a fresh "yuba" or fresh lifted-up "yuba" which preserves a smooth mouthfeel and a soybean milk flavor has not been pasteurized, its shelf life is as short as one or two days after being marketed. On the other hand, a dried "yuba" has a low water content, which gives it a longer shelf life, but it has a hard mouthfeel and a less preferable flavor.

When only a "yuba" is sterilized by heating in order to improve storability, the "yuba" becomes coagulated and its mouthfeel becomes hard. On the other hand, when it is frozen for improving storage stability, it undergoes frozen denaturation, resulting in a hard and stiff mouthfeel once being thawed. Thus, its way of marketing is restricted because it can not be subjected to frozen storage.

In order to prevent any freezing denaturation, JP 2001-57860 A discloses the addition of 0.1 to 25% of saccharides to soybean milk used for producing a fresh "yuba" whereby preventing the freezing denaturation, or the addition of 0.1 to 25% of saccharides to soybean milk in which a "yuba" is soaked. However, the invention of this patent application fails to obtain the desired smooth mouthfeel and flavor which are experienced with a fresh lifted-up "yuba". Further, there is no difference in storability after thawing between the product of this patent application and a commercially available fresh "yuba" by chilled distribution because the product is not subjected to heating before freezing.

JP 3-201960 A discloses improvement of chilled storage stability by filling soybean milk together with a "yuba" in a casing and then heating. However, this patent application is silent on frozen distribution since it has been a matter of a common knowledge of those skilled in the art that a "yuba" can not be frozen. Further, a fresh "yuba" which has not been subjected to any drying process undergoes, when being heated together with soybean milk, a re-dissolution in the soybean milk, resulting in the loss of the original form of the "yuba".

Thus, a method for producing a frozen "yuba" capable of exhibiting a smooth and satisfactorily flavored mouthfeel like that of a fresh lifted-up "yuba", which has a long shelf life after being thawed, has not yet been invented.

Accordingly, the present invention provides a "yuba" which exhibits a mouthfeel and a flavor comparable with those of a fresh lifted-up "yuba", even after being frozen and then being thawed.

DISCLOSURE OF THE INVENTION

The present invention is a method for producing a frozen "yuba" comprising heating and freezing a "yuba" whose water content has been adjusted at 60% or less together with soybean milk. The heating together with soybean milk is preferably carried out under conditions of 70 to 100° C. at which sterilization effect is expected. Further, the concentration of the soybean milk is adjusted to 2 to 12 Bx, preferably 4 to 10 Bx and a mixing ratio of the "yuba", and the soybean milk is adjusted to 1:1 or higher, preferably 1:10.

BEST MODE FOR CARRYING OUT THE INVENTION

In the present invention, a "yuba" should be employed after being subjected to a drying step so that its water content becomes 60% or less, preferably 30 to 50%, and this step serves to strengthen the protein binding in the "yuba" and to allow the resistance to be exerted in the subsequent heating step in the presence of soybean milk. Thus, when a "yuba" whose water content is 60% or higher, i.e., a so-called fresh "yuba" is subjected to the subsequent heating step, an almost complete dissolution in the soybean milk with its original form being lost, resulting in a remarkable reduction of commercial value.

When a "yuba" is heated in the absence of soybean milk, the "yuba" becomes hard, and, in case that several films are stacked, films adhere to each other, which makes it difficult to separate into single individual films. In order to obtain a separated single individual film, it is essential to use soybean milk which serves as a lubricant.

For reducing the water content to 60% or less, a "yuba" may be dried for example by spontaneous drying or hot air drying. A "yuba" whose water content has been once adjusted may be stored frozen and then may be used as it is or after thawing.

When a "yuba" is subjected to a freezing step, its mouthfeel and flavor is deteriorated. By taking into this, the present inventors have studied heating of "yuba" together with soybean milk so as to adjust its mouthfeel before freezing to a soft and smooth mouthfeel with providing the flavor and taste of the soybean milk with the "yuba" to obtain a "yuba" having tenderness, smoothness and a flavor similar to those of a fresh lifted-up "yuba".

A "yuba" having a water content of 60% or less can be freely imparted with the desired tenderness which may vary from that of a fresh "yuba" to that of a fresh lifted-up "yuba" by adjusting the heating conditions. Moreover, even a dried "yuba" having a pool flavor can be imparted with a good soybean taste by increasing the concentration of the soybean milk used here.

In order to further improve taste, soybean milk used may be supplemented with auxiliary materials capable of improving soybean flavor, saccharides, sweeteners and starch degradation products for modifying the sweetness of a soybean paste, liquid tofu, soybean flake or soybean milk, as well as seasonings including Japanese taste seasonings, western taste seasonings, Chinese soup seasonings, miso, sesame (ground sesame or sesame paste), soy sauce, salt, and the like to obtain a completely different flavor.

Besides, a concentration of soybean milk of 12 Bx or higher is not preferred since it causes remarkable frozen denaturation of the soybean milk.

A poorly film-formed "yuba" (one whose water content exceeds 60% such as fresh "yuba", fresh lifted-up "yuba", pick-up "yuba") is not preferred since it dissolves in soybean milk almost entirely upon heating.

The heating conducted herein serves not only as a means for heating a hard and poorly flavored dried "yuba" together with soybean milk to produce a soft and highly flavored "yuba" but also as a heat sterilization means. Because of this heating step, the "yuba" becomes a heated product before freezing and therefore, it can be stored for a period as long as two weeks in a refrigerator after being thawed. Thus, the "yuba" can be consumed safely even in the summer in addition to the three other seasons.

The terms used in the present invention will be illustrated.

First, a "yuba" means a film formed on the surface of heated soybean milk and lifted up by a skewer or wire. A "yuba" which has not been dried is referred to as a fresh "yuba", among which the very first film lifted up with soybean milk is referred to as a fresh lifted-up "yuba", whose flavor and texture are excellent especially and whose water content exceeds 60%. A "yuba" which was subjected to spontaneous drying or hot air drying is referred to as a dried "yuba".

The soybean milk used herein may be any soybean milk, including those obtained by hot grinding or cold grinding. The soybean milk having a concentration of 2 to 12 Bx, preferably 4 to 10 Bx, is used and the ratio between a "yuba" and soybean milk used together is generally 1:1 or higher, preferably 1:10, though it may vary depending on the degree of dryness of the "yuba" as well as the soybean milk concentration. When a concentration of soybean milk is too low, or mere water is used, mouthfeel of after thawing becomes harder. Further, when an amount of soybean milk relative to a "yuba" is too small, or soybean milk is not added, mouthfeel of after thawing mouthfeel becomes harder and, if several "yuba" films are stacked, separated single individual films cannot be obtained because they firmly adhere to each other.

When a "yuba" and soybean milk are used in a ratio of 1:1 or higher, there is no problem and, when they are combined with a Chinese soup seasoning, a soybean milk soup containing "yuba" can be served. Further, when a soup or a Chinese soup mix together with a Chinese noodle are added thereto, a soybean milk noodle containing "yuba" can be served. Furthermore, when a cooked rice is added thereto, a "yuba" rice porridge can be served.

When a "yuba" and soybean milk are contained in a retort pouch, the heating may be carried out with or without sealing the pouch. The heating may also be carried out by using a cooking pot or by steam heating in a stainless-steel vat. The heating is carried out at 70 to 100° C., preferably 80 to 90° C., for a period of 5 to 120 minutes, preferably 30 to 60 minutes, followed by freezing. The freezing is preferably a quick-freezing.

While the thawing of the resultant product for eating may be spontaneous thawing or heating thawing, it is preferably carried out using a microwave or by boiling.

EXAMPLES

The present invention is further illustrated by the following EXAMPLES which are not intended to restrict the technological scope of the present invention.

Example 1

A fresh "yuba" was dried with hot air to obtain a "yuba" having water content of 50%, 30 g of which was then combined with 70 g of 10 Bx soybean milk prepared by a conventional method and then placed in a retort pouch (made from NY15/LLDP85), followed by vacuum-sealing. The pouch was sterilized with heating for 30 minutes in a steaming chamber controlled at 90° C. Then, it was cooled with running water and frozen in a freezing chamber at −35° C.

Example 2

According to the same method as that described in EXAMPLE 1, freezing was carried out except that stainless-steel vat was used instead of the retort pouch upon heating the "yuba" and the soybean milk, and the resultant after heating was dispensed into microwavable containers in portions and frozen without sealing.

Example 3

According to the same method as that described in EXAMPLE 1 freezing was carried out except that a "yuba" obtained by drying a fresh "yuba" with hot air and having water content of 5% was used, 270 g of soybean milk was filled and heating was carried out at 90° C. for 60 minutes.

Example 4

According to the same method as that described in EXAMPLE 1, freezing was carried out except that a "yuba" having water content of 60% was used and heating was carried out at 80° C. for 30 minutes.

Example 5

According to the same method as that described in EXAMPLE 1, freezing was carried out except that a "yuba" obtained by drying a fresh "yuba" with hot air and having water content of 30% was used, 150 g of the soybean milk was filled and heating was carried out at 90° C. for 30 minutes.

Example 6

According to the same method as described in EXAMPLE 1, freezing was carried out except that soybean milk at a concentration of 4 Bx was used.

Example 7

According to the same method as described in EXAMPLE 1, freezing was carried out except that 300 g of soybean milk was filled.

Comparative Example 1

According to the same method as described in EXAMPLE 1, freezing was carried out except a "yuba" having water content of 62% was used, and heating was carried out at 80° C. for 30 minutes.

Comparative Example 2

According to the same method as described in EXAMPLE 1, freezing was carried out except that a "yuba" obtained by drying a fresh "yuba" with hot air and having water content of 5% was used, 270 g of soybean milk was filled and heating was carried out at 65° C. for 30 minutes.

Comparative Example 3

According to the same method as described in EXAMPLE 1, freezing was carried out except that a "yuba"

having water content of 60% was used, water was used instead of soybean milk and heating was carried out at 80° C. for 30 minutes.

Comparative Example 4

According to the same method as described in EXAMPLE 1, freezing was carried out except that no soybean milk was used and only a "yuba" was placed in a retort pouch.

Comparative Example 5

According to the same method as described in EXAMPLE 1, freezing was carried out except that the amount of soybean milk was reduced from 80 g to 20 g.

(Mouthfeel Evaluation Method)

The product of EXAMPLE 2 was thawed by heating in a microwave at 500 W for 3 minutes before eating. Otherwise, the product was thawed by heating in boiling water before eating.

A product scoring 5 was evaluated as good and a product scoring 1 was evaluated as poor, while any of those scoring 3 or higher was evaluated to have a commercial value. Five panelists were included in the evaluation.

Comparative Example 1

The evaluation was not made because the original shape of the "yuba" was lost due to dissolution in the soybean milk.

Comparative Example 2

The "yuba" was not soften.

Based on the above results, a "yuba" having a smooth and soft mouthfeel and a satisfactory taste can be obtained by using a "yuba" having water content of 60% or higher and by keeping a temperature of heating after filling soybean milk at 70° C. or higher.

(Evaluation of Necessity for Soybean Milk)

Example 6

A "yuba" having a soft mouthfeel and a taste similar to those of a fresh "yuba" was obtained.

Example 7

A "yuba" having a soft mouthfeel and a taste similar to those of a fresh "yuba" was obtained.

When it was combined with a Chinese soup seasoning, it could be consumed as a soybean milk soup containing "yuba" films.

(Results of mouthfeel evaluation)

|  | EXAMPLE 1 | EXAMPLE 2 | EXAMPLE 3 | EXAMPLE 4 |
|---|---|---|---|---|
| Mouthfeel | 5 | 5 | 4 | 5 |
| Flavor | 5 | 5 | 5 | 5 |

|  | EXAMPLE 5 | EXAMPLE 6 | EXAMPLE 7 | COMPARATIVE EXAMPLE 1 |
|---|---|---|---|---|
| Mouthfeel | 5 | 4 | 5 | — |
| Flavor | 5 | 3 | 5 | — |

|  | COMPARATIVE EXAMPLE 2 | COMPARATIVE EXAMPLE 3 | COMPARATIVE EXAMPLE 4 | COMPARATIVE EXAMPLE 5 |
|---|---|---|---|---|
| Mouthfeel | 2 | 2 | 1 | 2 |
| Flavor | 3 | 1 | 2 | 2 |

(Evaluation of Water Content of "yuba" and Degree of Heating)

Example 1

A "yuba" having a smooth and soft mouthfeel and a taste similar to those of a fresh lifted-up "yuba" was obtained.

Example 2

A "yuba" having a smooth and soft mouthfeel and a taste similar to those of a fresh lifted-up "yuba" was obtained.

Example 3

A "yuba" having a smooth and soft mouthfeel and a taste similar to those of a fresh lifted-up "yuba" was obtained.

Example 4

A "yuba" having a smooth and soft mouthfeel and a taste similar to those of a fresh lifted-up "yuba" was obtained.

Example 5

A "yuba" having a soft mouthfeel and a taste similar to those of a fresh "yuba" was obtained.

Comparative Example 3

The taste was deteriorated and the mouthfeel became harder when compared with those before freezing, due to dissolution of tasty ingredients into water.

Comparative Example 4

The "yuba" became harder.

Comparative Example 5

The "yuba" became harder.

Based on the above results, a "yuba" having a smooth mouthfeel and a satisfactory flavor can not be obtained without addition of soybean milk, with addition of a smaller amount of soybean milk, or with addition of only water.

INDUSTRIAL APPLICABILITY

According to the present invention, it is possible to produce a "yuba" capable of being distributed by freezing, thereby making it possible to provide a highly flavored and smooth "yuba" which has a long shelf life and exhibits a mouthfeel equivalent to that of a fresh lifted-up "yuba" even after freezing followed by thawing.

What is claimed is:

1. A method for producing a frozen "yuba" comprising heating and freezing a "yuba" whose water content has been adjusted at 60% or less together with soybean milk.

2. The method according to claim 1, wherein said heating is carried out at 70 to 100° C.

3. The method according to claim 1 wherein the concentration of the soybean milk is 2 to 12 Bx.

4. The method according to claim 1 wherein a mixing ratio of the "yuba" and the soybean milk is 1:1 or higher.

5. The method according to claim 2 wherein the concentration of the soybean milk is 2 to 12 Bx.

6. The method according to claim 2 wherein a mixing ratio of the "yuba" and the soybean milk is 1:1 or higher.

7. The method according to claim 3 wherein a mixing ratio of the "yuba" and the soybean milk is 1:1 or higher.

8. The method according to claim 4 wherein a mixing ratio of the "yuba" and the soybean milk is 1:1 or higher.

9. The method according to claim 5 wherein a mixing ratio of the "yuba" and the soybean milk is 1:1 or higher.

* * * * *